INVENTOR
ARTHUR BISBERG

> United States Patent Office 3,623,356
Patented Nov. 30, 1971

3,623,356
DEW POINT HYGROMETER
Arthur Bisberg, Lexington, Mass., assignor to
EG & G, Inc., Bedford, Mass.
Filed Dec. 18, 1969, Ser. No. 886,220
Int. Cl. G01n 25/02
U.S. Cl. 73—17 A  14 Claims

ABSTRACT OF THE DISCLOSURE

A dew point hygrometer includes means for automatically compensating for the build-up of contaminants on the reflective surface of the hygrometer mirror. In a first embodiment, the hygrometer is periodically compensated under the control of a timing motor which energizes a relay for interrupting the cooling current servo loop and for providing an offset to the bridge circuit of the hygrometer. In addition, the circuit of a second relay, which is responsive to an error signal developed from across the bridge circuit of the hygrometer, is completed so that this may control the circuit of a motor driving a compensating potentiometer in the optical sensing bridge circuit of the hygrometer. In a second embodiment, the compensation is provided continuously. This is accomplished by introducing an oscillation to the cooling current supplied to the thermoelectric cooler of the hygrometer and by detecting the amplitude of the oscillation as detected by the optical sensing bridge circuit of the hygrometer. A compensating resistor in the bridge circuit is then controlled as a function of the magnitude of this amplitude. The oscillation in the cooling current is provided, in one version, by providing an auxiliary alternating current generator which provides an oscillatory current which is added to the cooling current. In a second version, the cooling current servo loop is designed to be self-oscillatory, providing the aforementioned oscillation in the cooling current.

BACKGROUND OF THE INVENTION

This invention relates to dew point hygrometers and, more particularly, to dew point hygrometers provided with means for compensating for the build-up of contamination on the reflective surface of the mirror thereof.

Dew-point hygrometers are frequently employed for determining the dew point of a gas sample. A mirror is exposed to the gas sample, and the formation of dew thereon is detected by means of a photosensitive detector responsive to the light reflected therefrom. The photosensitive detector develops an error signal which is used to control the cooling current provided to a thermoelectric cooling device associated with the mirror to maintain the mirror at the dew point and thus maintain a predetermined thickness of condensate on the mirror surface. A temperature measuring device is employed for measuring the temperature of the mirror, thus giving an indication of the dew point of the gas sample.

In the conventional mode of operation of a dew point hygrometer of the prior art, condensate is sensed by the steady change in light reflected from the mirror surface. As contamination builds up on the mirror surface causing an additional reduction in the light level, the hygrometer responds by reducing the level of condensate until eventually there is no longer any condensate and all of the reduction in light level is due to contamination. At this point, the hygrometer erroneously reads a temperature above the dew point temperature of the gas sample.

Accordingly, it has been necessary periodically to rebalance prior art dew point hygrometers manually to compensate for the changes in the reflective characteristics of the mirror surface due to the accumulation of contaminants. When the hygrometer is set up to operate with a high surface density of condensate, it is less susceptible to the effects of contamination, but it tends to have a sluggish response. Best response is obtained with the hygrometer adjusted to operate with a low surface density of condensate, but the contamination problem is more severe. In any event, the contamination level eventually determines the rate at which the hygrometer must be manually rebalanced.

This requirement for periodic manual rebalancing of the hygrometer requires the occasional attention of an operator. As a result, prior art dew point hygrometers have not been useful in situations requiring unattended operation over extended periods, such as in continuous process control operations.

SUMMARY OF THE INVENTION

It is accordingly a principal object of the present invention to provide automatic means for compensating for the build-up of contaminants on the reflective surface of the mirror of a dew point hygrometer.

It is also an object of the invention to provide an automatically balanced dew point hygrometer which virtually eliminates the effect of the shift in balance caused by contaminants on the mirror surface and permits operation at low condensate density with improved hygrometer response.

It is another object to provide a dew point hygrometer suitable for unattended operation over extended periods.

In one aspect, it is an object of the invention to provide means for automatically and periodically checking the balance point of a dew point hygrometer and for automatically making such compensation for the build-up of contaminants as is necessary to maintain the maximal operation of the hygrometer.

In another aspect of the invention, it is an object thereof to provide a continuous system for compensating for the build-up of contaminants on the reflective surface of the mirror of a dew point hygrometer.

Briefly, a first embodiment of the invention contemplates the employment of means for periodically checking the balance point of a dew point hygrometer to effect adjustment of a balance resistor for automatically compensating for the contaminants present on the reflective surface of the mirror of the dew point hygrometer. A timing motor is provided to control a timing switch and effect periodic energization of a first relay which controls contacts for interrupting the cooling current servo loop, contacts for providing an error signal offset from the bridge circuit of the hygrometer, and contacts for completing the circuit of a second relay. The second relay is also in circuit with an electronic switch responsive to a predetermined error signal output developed from the bridge circuit of the hygrometer. When the timing motor initiates a balancing cycle, the servo loop is interrupted and the temperature of the mirror is forced to rise sufficiently to evaporate all dew present thereon. The bridge circuit is then responsive to the reduction of reflectivity of the mirror due to dirt or contaminants on the mirror surface. An error signal output, which is a function of this reduction in reflectivity, is provided by the bridge circuit and, if exceeding a predetermined magnitude, causes energization of the second relay. This relay controls the circuit of a balance motor driving a balance potentiometer in the bridge circuit. A holding circuit closed by the second relay maintains the energization of the first relay even after the timing switch returns to its normal position. If the second relay is actuated when the timing switch returns to its normal position, the balance motor will be energized and continue to operate until a balance point is attained.

In a second embodiment of the invention, the hygrometer is continuously balanced. The continuous balancing system makes use of the fact that the density of condensate on the mirror changes with small changes in mirror temperature about the dew point, while the density of the contamination on the mirror is independent of small changes in temperature. The system utilizes a small constantly changing increment of temperature about the dew point temperature to cause similar changes in the reflected light level from the mirror surface as a result of changing condensate surface density. Should the accumulation of contamination reduce the condensate density to the point where it is essentially zero, then the amplitude of the changes in light level will also be reduced. This reduction in the amplitude of the changes in light level is then detected and used to rebalance the hygrometer to a heavier condensate layer. In order to introduce the aforementioned small constantly changing increment of temperature about the dew point temperature, it is contemplated, in one version, that an alternating current generator provide an alternating current signal to be added to the cooling current supplied to the thermoelectric cooling means associated with the mirror of the hygrometer. It is also contemplated, in another version, that this alternating increment of cooling current could be supplied by judiciously designing the amplifiers of the cooling current servo loop so that the loop becomes self-oscillatory. In either case, the amplitude of this oscillation is detected by providing a tuned amplifier and detector which provides an output signal whose magnitude is a function of the magnitude of the oscillation. This output signal is employed for controlling a balance compensating resistor in the bridge circuit of the hygrometer. This may be effected by providing a lamp to receive the output signal, the lamp providing a varying amplitude of light to a photoresistor serving as the balance resistor in the bridge circuit.

In both embodiments of the invention, above described, meters may be provided to provide information as to the control condition of the hygrometer.

The foregoing and other objects, advantages, and features of the invention, and the manner in which the same are accomplished will become more readily apparent upon consideration of the following detailed description of the invention when taken in conjunction with the accompanying drawings, which illustrate preferred and exemplary embodiments.

DETAILED DESCRIPTION OF THE PREFERRED EMBODIMENTS

Figure 1:
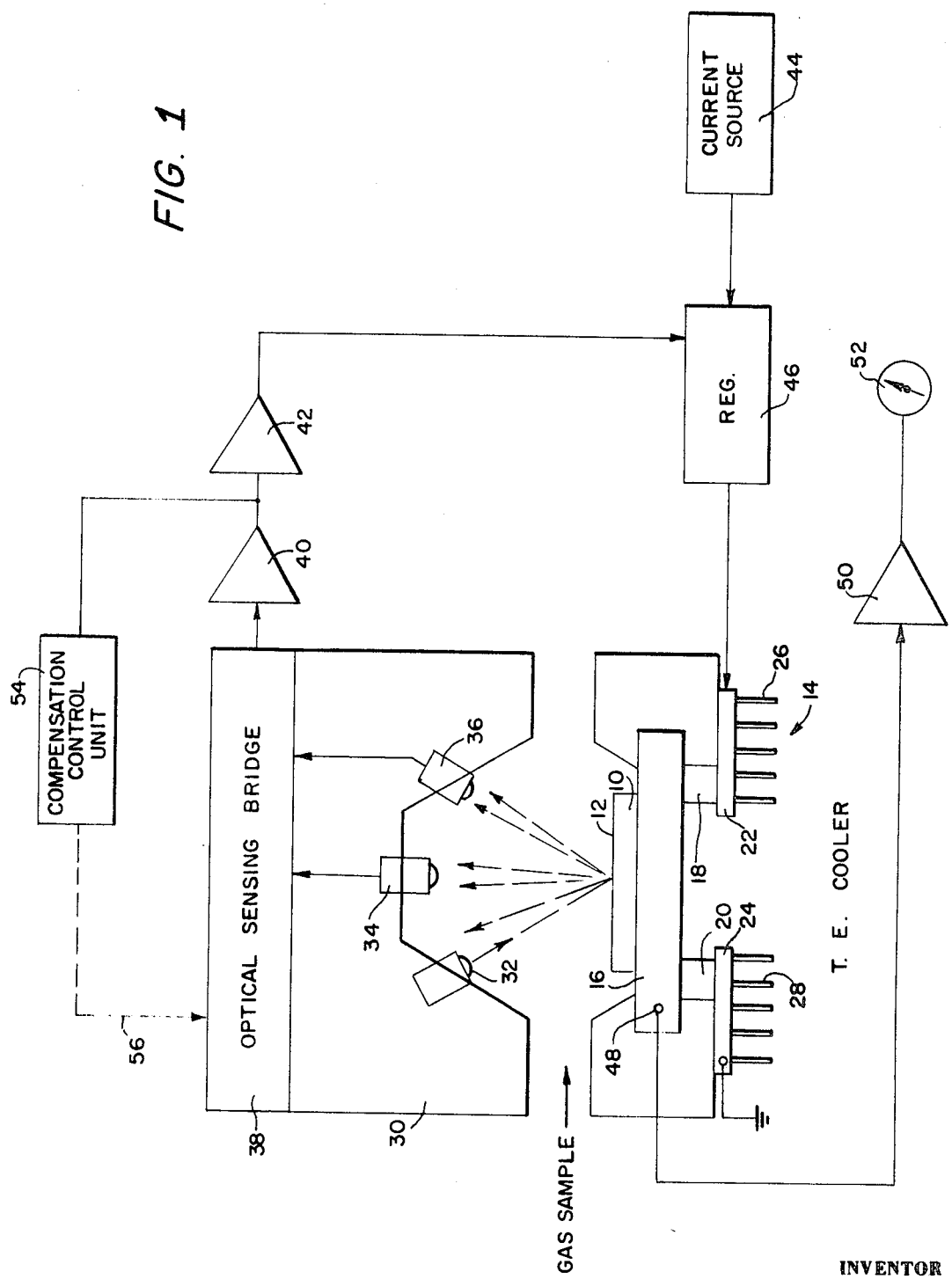
FIG. 1 is a schematic block diagram illustrating the invention in its broadest aspect.

FIG. 1 illustrates a typical dew point hygrometer of the prior art broadly provided with automatic compensation means of the present invention. The hygrometer will, as is known in the art, measure the dew point of a gas sample which is caused to pass over a mirror 10 by detecting the build-up of condensate on the reflecting surface 12 of the mirror. The temperature of the mirror is controlled by a thermoelectric cooler 14 so as to maintain the temperature of the mirror at the dew point of the gas sample. The cooler comprises a bus bar 16 upon one surface of which the mirror 10 is mounted. A semiconductor 18 is connected adjacent one end of the bus bar, while a semiconductor 20 is connected adjacent the other end thereof. A connector rod 22 connects a source of cooling current to semiconductor 18, and a connector rod 24 serves this function with respect to semiconductor 20, being connected to ground to complete the circuit of the current source. Suitable cooling fins 26 and 28 are coupled to rods 22 and 24, respectively, as is known in the art.

A servo loop controls the temperature of mirror 10 by controlling the cooling current supplied to thermoelectric cooler 14. The servo loop includes a sensor unit 30 which senses the reflectivity of the reflective surface 12 of mirror 10. This is accomplished by directing a beam of light from lamp 32 upon the reflective surface 12. When no condensate has formed on reflective surface 12, the light is reflected to a photosensitive cell 36. However, when condensate begins to form on the reflective surface 12, the light is scattered. Some of this scattered light is detected by a photosensitive cell 34, while the level of light reflected to photosensitive cell 36 is reduced. Both of these photosensitive cells are connected in an optical sensing bridge 38 which provides an error signal to a preamplifier 40. A power control amplifier 42 provides a control signal which serves to regulate the current from a current source 44 by controlling a current regulator 46.

When optical sensing bridge 38 is unbalanced, an error signal output of such magnitude is supplied from the bridge that cooling commences. The output from unbalanced bridge 38 is amplified by preamplifier 40 and amplifier 42 and applied as a control signal to regulator 46 to control the current from cooling current supply 44. As the mirror cools to the dew point, formation of dew on mirror 10 causes attenuation of the light directly reflected to cell 36 and an increase in the light received by cell 34. This forces the bridge toward the balanced point, proportionally decreasing the cooling current supplied to cooler 14 until a stable current is attained, whereby a thin film of dew is maintained on mirror surface 12. With the mirror stabilized at the dew point, the temperature of the mirror then represents the dew point temperature by definition. This temperature is monitored by means of a thermocouple 48 positioned adjacent to mirror 10, the output of which is amplified by an amplifier 50 driving a suitable measuring instrument 52.

The hygrometer tracks changes in dew point by increasing or decreasing the cooler current about the stable point in proportion to the thickness of the dew deposit on the mirror. Should the dew layer tend toward thinning due to a lower dew point gas sample, an increase in the cooling current is caused with a lowering of the mirror temperature to the new dew point. In like fashion, should the dew layer tend to thicken due to a higher dew point gas sample, a decrease in the cooling current is caused, resulting in the mirror heating to the higher dew point.

According to the present invention, compensation is provided for contamination or dirt collecting on the reflective surface 12 of mirror 10, which contamination, as explained above, tends to effect the accuracy and sensitivity of the hygrometer. Accordingly, a compensation control unit 54 is shown coupled to the output of the amplifier 40 for providing an adjustment 56 to optical sensing bridge 38 in a manner calculated to effect the desired compensation. The particular way in which this compensation is effected will be explained in greater detail hereinafter when we consider the embodiments of FIGS. 2, 3 and 4.

Figure 2:
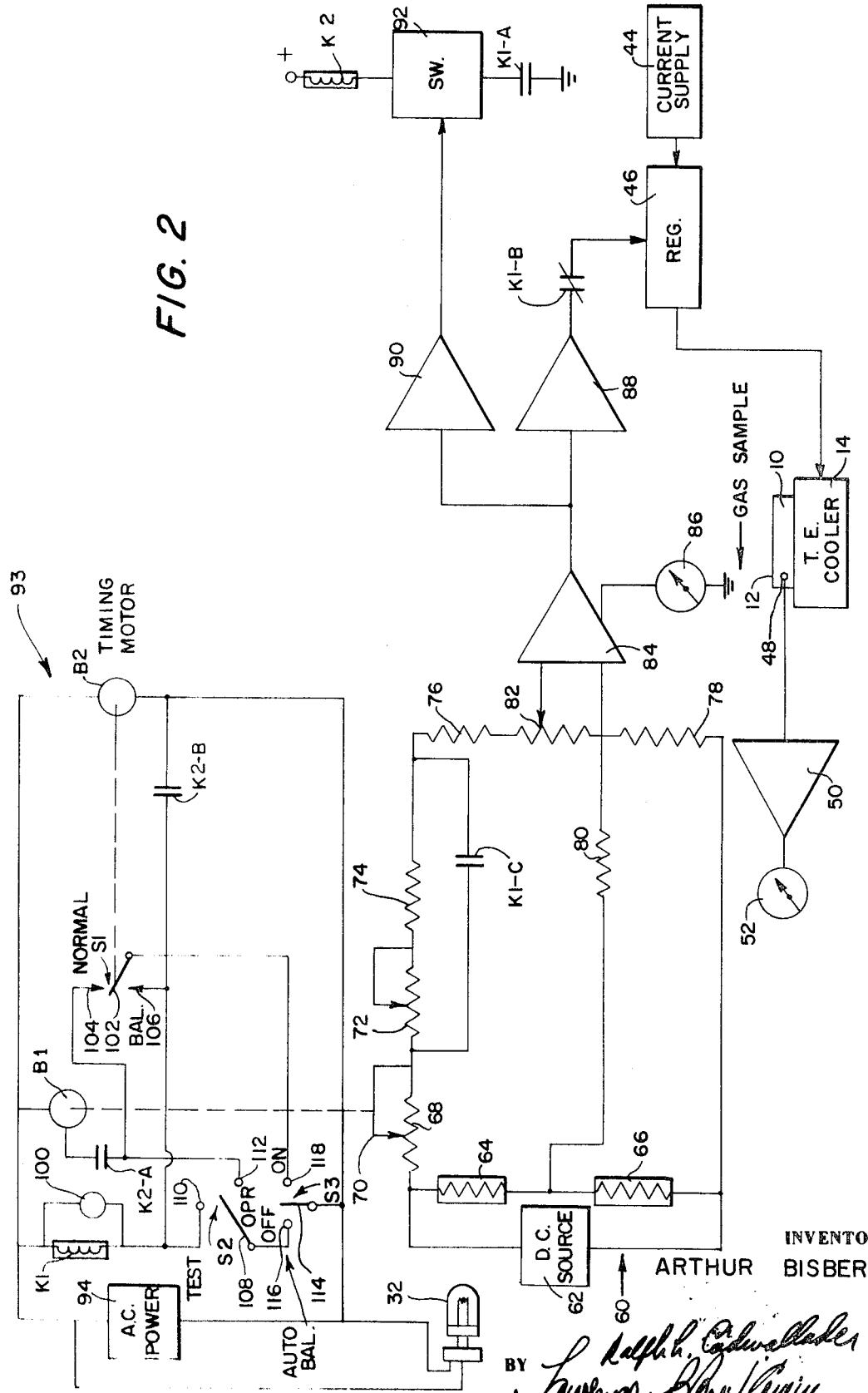
FIG. 2 is a schematic block diagram, in greater detail, of a first embodiment of the invention.

The embodiment of FIG. 2 provides compensation for contamination at periodic intervals. The light from lamp 32 is reflected from the reflective surface 12 of mirror 10 and is sensed by optical sensing bridge 60. This bridge is energized by a direct current voltage source 62 connected across one branch containing photoresistor elements 64 and 66 connected in series. The other branch of the bridge comprises a compensation or balance resistor 68 having a variable tap 70 which, as will be presently described, will be adjusted automatically to compensate for contamination on reflective surface 12 of mirror 10. A variable resistor 72, which normally serves to establish the dew layer thickness on which the hygrometer will operate, and a fixed resistor 74 are connected in series with compensating resistor 68 and are shunted by normally open relay contacts K1–C, the purpose of which will be explained hereinafter. A fixed resistor 76 and a fixed resistor 78 are also connected in series in this branch on opposite sides of a potentiometer 82 having a variable tap for a coarse balance adjustment of the bridge connected to an input terminal of a preamplifier 84. The other input of preamplifier 84 is connected through a resistor 80 to the junction between photoresistors 64 and 66. Preamplifier 84 is thus connected across the output diagonal of optical sensing bridge 60. In order to monitor the control condition of the hygrometer, a meter 86 may be connected to an output of preamplifier 84. Another output from preamplifier 84 is coupled through a power control amplifier 88 through normally closed relay contacts K1–B to apply a control voltage to a current regulator 46 regulating the supply of cooling current from a current supply 44 to the thermoelectric cooler 14.

In the normal operating mode of the hygrometer, the hygrometer operates in a conventional fashion to maintain the temperature of mirror 10 at the dew point of a gas sample. The optical sensing bridge 60 senses the formation of condensate on the reflective surface 12, providing an error signal through the servo loop just described for regulating the cooling current to the thermoelectric cooler 14. A thermocouple 48, amplifier 50 and meter 52 are employed for indicating the temperature of mirror 10.

In order to sense contamination build-up on reflective surface 12 of mirror 10, an amplifier 90 is coupled to the output of preamplifier 84 and provides a control signal for an electronic switch 92, which may be a transistor switch. Switch 92 is connected in series with a source of D.C. voltage, a relay K2, and normally open relay contacts K1–A. As long as contacts K1–A remain open, electronic switch 92 cannot cause the energization of relay K2 from the voltage source indicated. Control of relay K2 is possible only at certain predetermined intervals as will be presently described.

A control unit 93 is energized by an alternating current voltage source 94, which also serves as the source of power for lamp 32. A timing motor B2 is connected across this voltage source and periodically operates a timing switch S1. This will be accomplished by driving a cam plate mounted on the motor shaft and having switch actuating pins. The frequency and duration of balancing intervals are selected by installing, removing or rearranging the actuating pins. Typically, preselected intervals ranging from once every hour to once every twelve hours may be selected. Switch S1 includes a movable contact arm 102 which is normally in engagement with a "normal" contact 104. However, at the preselected time, as determined by the adjustment of the cam plate actuating pins, arm 102 is moved into engagement with the "balance" contact 106. This will initiate the automatic balancing and contamination compensating cycle.

Before proceeding with an explanation of how this is effected, it is to be noted that a relay K1 is connected in a series circuit with a switch S2 and a switch S3 across alternating current power supply 94. An indicator lamp 100 is connected in parallel with relay K1 and illuminates a red warning light on the front panel of the hygrometer to indicate when it is energized and to signify that a balancing operation is in progress. Switch S2 serves to select a test mode by moving a contact arm 108 into engagement with a "test' contact 110 or an operating mode by movement of arm 108 into engagement with an "operate" contact 112. Switch S3 serves to select the automatic balancing mode of operation. When a contact arm 114 of switch S3 is in engagement with an "off" contact 116, the automatic balancing operation is not effected. However, when arm 114 is in engagement with an "on" contact 118, automatic balancing of the hygrometer is selected.

Returning to relay K1, it will be noted that it has first, normally open contacts K1–A, previously mentioned, in series with electronic switch 92 and relay K2. It has normally closed contacts K1–B connected in series between amplifier 88 and current regulator 46. It also has normally open contacts K1–C connected across resistors 72 and 74 for a purpose which will be presently described.

When switch S2 is in the "operate" position with arm 108 in engagement with contact 112 and automatic balance switch S3 is in its "on" position with arm 114 in engagement with contact 118, movement of arm 102 of timing switch S1 by timing motor B2 to balance contact 106 serves to energize relay K1. This is accomplished by completing the circuit across alternating current power supply 94 through arm 102 and contact 106 of switch S1 and contact 118 and arm 114 of automatic balance switch S3. Energization of relay K1 serves to close contacts K1–A and contacts K1–C and to open contacts K1–B. Closure of contacts K1–A enables actuation relay K2, putting switch 92 in position to control the energization of relay K2. Closure of contacts K1–C serves to short circuit resistors 72 and 74, unbalancing optical sensing bridge 60 and, in effect, placing an offset or false error signal at the output of the bridge. This serves to provide a larger error signal for more effective control of electronic switch 92. The offset also affects the reading on meter 86 so that when the mirror is clear of condensate and the hygrometer is properly compensated, the meter will provide a control condition indication at mid-scale. The opening of contacts K1–B interrupts the servo loop removing the control from current regulator 46. This will cause the regulator to block the cooling current and permit the mirror to become warmer, bringing it to a temperature level which results in no formation of condensate on the reflective surface of mirror 10 during the balancing cycle. In order to increase the heating rate of the mirror and expedite the evaporation of condensate from reflective surface 12, a small reverse trickle current may be provided so that thermoelectric cooler 14 will operate as a heater in the absence of cooling current. This may be accomplished by providing a mirror heat boost circuit (not shown) including an additional relay to provide a reverse current to cooler 14.

The actuating pins on the cam plate associated with timing motor B2 will typically be adjusted to maintain arm 102 in engagement with balance contact 106 for five minutes. This will provide time to permit evaporation of condensate from the mirror surface 12.

If, at this time, the reflective surface 12 of mirror 10 is contaminated so that the light from lamp 32 is reflected at a reduced level to photoresistor 66, an error signal increment will be added to the offset error signal providing an error signal output (through preamplifier 84 to amplifier 90. When this error signal output exceeds a predetermined level, it will cause actuation of electronic switch 92, thus completing the circuit of relay K2. This will result in the closing of relay contacts K2–B, providing a holding circuit to maintain relay K1 energized for the remainder of the balancing cycle. The energization of relay K2 also serves to close normally open contacts K2–A which are connected in series with a balance motor B1. It is to be noted, however, that this will not complete the circuit of balance motor B1, because the circuit through switch S2 contact 112 and arm 108 is interrupted by switch S3, arm 114 being in the "on" position in engagement with contact 118. This insures that the automatic balancing cycle will not be responsive to a residue of condensation remaining on reflective surface 12, this residue, as explained above, normally having ample time to evaporate while arm 102 of timing switch S1 is maintained in engagement with "balance" contact 106. After timing motor B2 causes arm 102 of timing switch S1 to return to engagement with "normal" contact 104, the circuit of balance motor B1 will be completed through contacts K2–A, contact 104 and arm 102 of timing switch S1, and contact 118 and arm 114 of switch S3. Holding contacts K2–B maintain energization of relay K1 making this possible. Balance motor B1 will then be caused to rotate in a given (clockwise) direction until balance resistor 68 is adjusted to a position causing compensation of the error signal increment developed by the contamination on reflective surface 12 of mirror 10. It is to be noted that balance motor B1 is always driven, when energized, in a single clockwise direction. When it has adjusted balance resistor 68 to its maximum value, it will then continue to rotate and, after a small discontinuity, bring movable contact 70 back to the minimum value of resistor 68, rotating until the balance position is reached. The error signal output will then fall below the predetermined level and electronic switch 92 will open breaking the circuit of relay K2. Relay K2 will then become de-energized and relay contacts K2–A will return to their normally open condition, opening the circuit of balance motor B1 and causing it to stop rotating with balance resistor 68 adjusted to the proper balance position.

After initiation of the balance cycle, balancing of the hygrometer is normally accomplished within five to six minutes. The instant the balance cycle is completed, meter 86 will provide a control condition indication at mid-scale.

De-energization of relay K2 will also result in the opening of holding circuit contacts K2–B. With timing switch S1 returned to its normal position, relay K1 will de-energize, causing contacts K1–A to return to their normally open condition. The servo control loop is restored by the closing of normally closed contacts K1–B. Contacts K1–C will again open. With the removal of the error offset introduced by contacts K1–C, the control condition as indicated by meter 86 is returned to full scale. The hygrometer enters the operating mode with a mirror surface that is free of dew or frost condensate. Therefore, the instrument is allowed to establish and stabilize on a new condensate layer before dew point data is taken from the instrument.

If sufficient contamination has accumulated on the mirror surface to preclude balancing of the instrument by further clockwise rotation of balance potentiometer 68, the balance error output signal will remain large, preventing termination of the balance cycle. When this occurs, the balance motor continues to rotate, and the front panel red warning light remains illuminated by lamp 100. The instrument should then be turned off, and the mirror should be cleaned. After this procedure, the instrument should be turned on and manually balanced. This is accomplished by the provision of a manual control knob on the shaft of balance motor B1. With switch S2 in the "test" position and switch S3 in the "off" position, the manual control knob is rotated to adjust balance resistor 68 until meter 86 indicates at mid-scale. At this time, switch S2 is returned to the "operate" position, and the hygrometer returns to its normal operating mode.

Under certain operating conditions, the time selected to heat mirror 10 and allow evaporation of dew from the mirror surface will not be sufficient to accomplish removal of all of the condensate. If the balancing operation is commenced with condensate remaining on the mirror surface, the balance point selected by the adjustment of balance resistor 68 will be more clockwise than if the circuit were operating on a dry mirror. This more clockwise position will cause the instrument to stabilize on a "thicker than normal" dew layer on the mirror. In itself, this does not degrade the accuracy of the instrument. However, after repeated automatic balancing operations, each more clockwise than the one before, the dynamic behavior of the instrument becomes sluggish and the balance control soon runs out of operating range. The instrument will then be maintained in an inoperative condition and will be unable to find a suitable balance point. This may be corrected for by increasing the rate of flow of the gas sample or by adjusting the actuating pins of the timing motor cam plate to increase the duration of the engagement of arm 102 with "balance" contact 106.

Switch S2 permits testing of the system. When arm 108 is moved to "test" contact 110, with automatic balance switch S3 in its "off" position, the circuit of relay K1 is completed, permitting a test cycle to be commenced even though timing motor B2 is maintaining arm 102 in its "normal" position. Relay K1 will then be energized closing contacts K1–A and K1–C and opening contacts K1–B. If the error signal output provided to switch 92 is sufficient to actuate this switch, relay K2 will be energized and close contacts K2–A and K2–B, establishing the holding circuit for relay K1. To initiate operation of balance motor B1, switch S3 is then returned to its "on" position. Balance resistor 68 is then driven to achieve balance de-energizing relay K2 as previously described.

The embodiment of FIG. 2 operates automatically at predetermined intervals to compensate for the contamination on the reflective surface of the mirror of a dew point hygrometer. It is also possible for this compensation to be effected on a continuous basis. This is accomplished in the embodiments of FIGS. 3 and 4.

Figure 3:
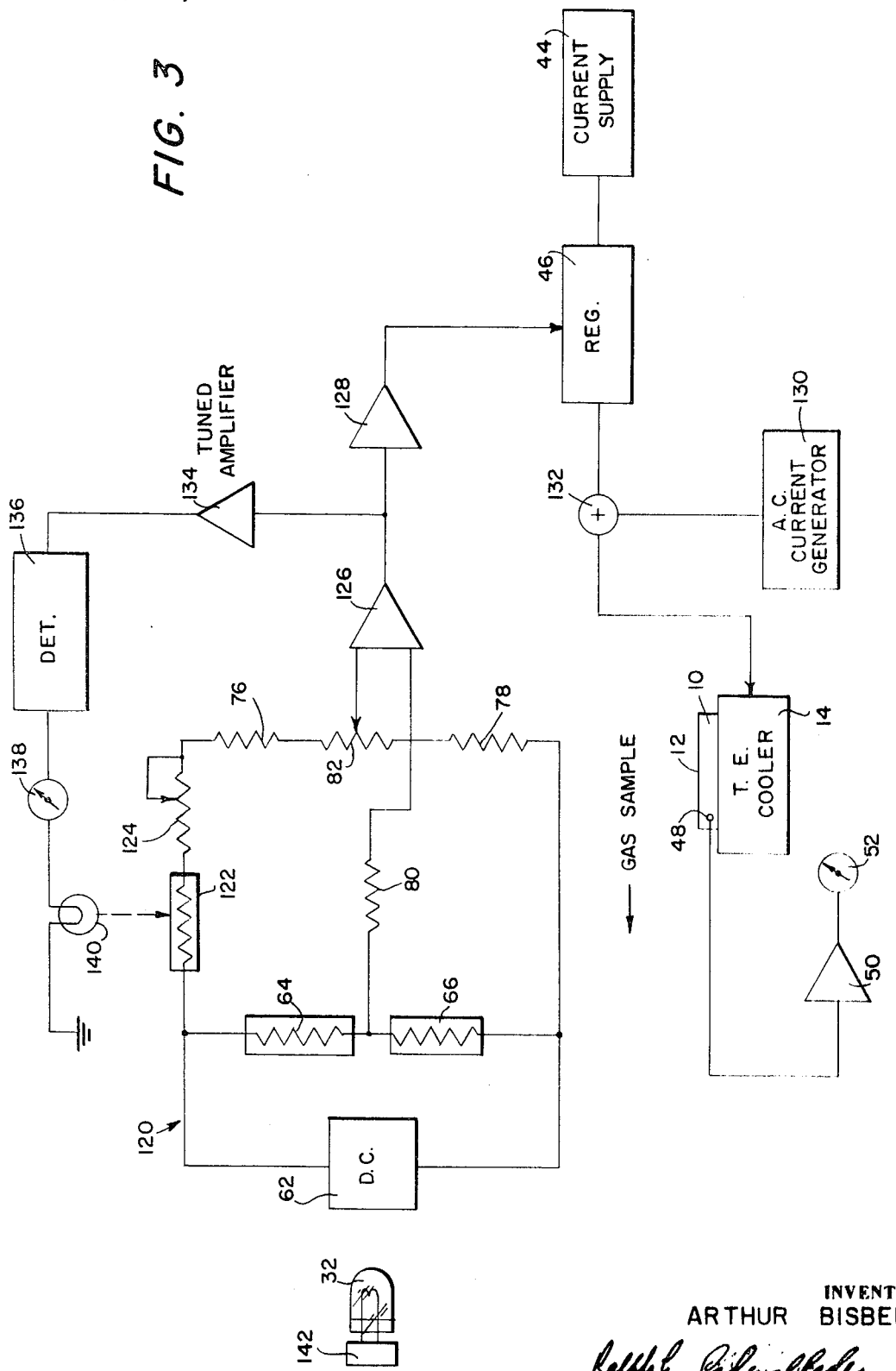
FIG. 3 is a schematic block diagram of a second embodiment of the invention.

Turning to FIG. 3, it will be noted that the lamp 32, which is energized from a power source 142, directs a beam of light on reflective surface 12 of mirror 10, which is maintained at the dew point by thermoelectric cooler 14. An optical sensing bridge 120 includes photoresistors 64 and 66 connected in one branch across a direct current power supply 62. The other branch of the bridge includes a balance resistor 122, which, in this embodiment, is in the form of a photoresistor, a dew layer thickness adjusting potentiometer 124, a fixed resistor 76, a potentiometer 82, and a fixed resistor 78. The tap of potentiometer 82 leads to one input terminal of a preamplifier 126, while the other input terminal of preamplifier 126 is connected from the junction point between photoresistors 64 and 66 through a fixed resistor 80. The output of preamplifier 126 is coupled to a power control amplifier 128 which provides a control signal regulating the cooling current from a current supply 44 by adjusting a current regulator 46. An alternating current generator 130 provides an oscillatory current which is added to the cooling current in an adder 132. The combined current is then applied to thermo-electric cooler 14 to control the temperature of mirror 10, the temperature of which is sensed by thermocouple 48, amplifier 50, and indicating instrument 52.

The magnitude of the current provided by alternating current generator 130 is such as to result in a variation of mirror temperature about the mean temperature of about 0.1 or 0.2 degrees F. The frequency is not critical. It may be as much as a few cycles per second, but 0.1 cycles per second is typical. In the case of an uncontaminated mirror under normal operation, the periodic variation of mirror temperature results in a periodic variation in the signal developed by optical sensing bridge 120. This signal is amplified by preamplifier 126; and the periodic variation in the signal is selected and amplified by a tuned amplifier 134, which selects signals of the frequency of the variation, corresponding to the frequency of the alternating current generator 130. A detector 136 converts the output of tuned amplifier 134 to a direct current which drives a control condition indicating instrument 138 to indicate the magnitude of the signal detected by tuned amplifier 134 to a direct current which drives a control condition indicating instrument 138 to indicate the magnitude of the signal detected by tuned amplifier 134 and energizes a lamp 140. The light from lamp 140 is directed upon photoresistor 122 to maintain the resistance of photoresistor 122 at a value which is a function of the intensity of the light emanating from lamp 140.

When contamination builds up on the mirror surface, the resultant reduction in reflectivity of the mirror surface tends to cause the servo loop to drive the mirror to a higher temperature which will be somewhat removed from the actual dew point. The variation in temperature introduced by the alternating current component of the current supplied to thermoelectric cooler 14 will then no longer be centered on the dew point, and the amplitude of the signal variation sensed by optical sensing bridge 120 will decrease. If enough dirt accumulates to result in a mean mirror temperature well about the dew point, then the variation in mirror temperature due to the alternating current component will not result in a signal variation at the output of the optical sensing bridge. This absence of signal variation is detected by tuned amplifier 134 and detector 136, causing a decrease in the direct current supplied through meter 138 and lamp 140. The reduction in the light intensity from lamp 140 causes an adjustment of the value of resistor 122 resulting in a correction to the system balance and causing a drop in mirror temperature with regained control loop performance. Thus, the periodic variation in mirror temperature acts as a tracer or indicator of the existence of condensate on the mirror surface even in the presence of contamination. The temperature output signal will show this variation, but the level of variation is so small as to be of no importance.

Figure 4:
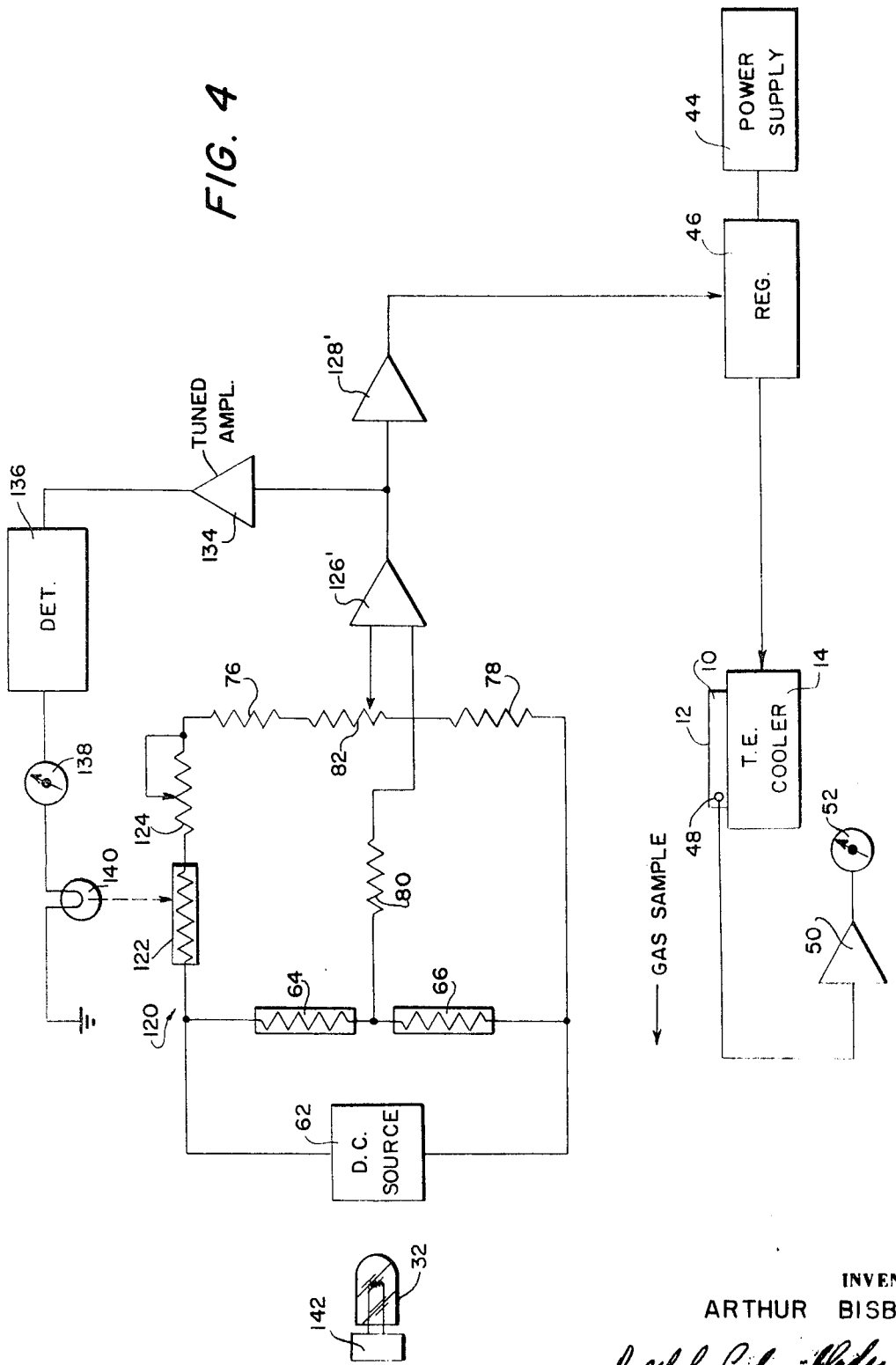
FIG. 4 is a schematic block diagram of another version of the second embodiment of the invention.

Another method of accomplishing the same result is illustrated in the embodiment of FIG. 4. This embodiment is essentially identical to the embodiment of FIG. 3, except that the alternating current generator is omitted. In this embodiment, the gain in the feedback system as provided by preamplifier 126' and power control amplifier 128' is increased to the point where slight instability occurs and the system is self-oscillatory. This eliminates the need for the alternating current generator. Of course, the design of the feedback loop should be such as to provide a frequency of oscillation comparable to that employed and provided in the embodiment of FIG. 3 and an amplitude of oscillation of about the same magnitude as provided by the embodiment of FIG. 3. When the oscillations result in a 0.1 to 0.2 degree F. variation in mirror temperature, the system is in the proper operating mode. Since this embodiment operates in all other respects identically to the embodiment of FIG. 3, no further detailed explanation of its operation is necessary here.

It is to be noted with respect to the embodiment of FIGS. 3 and 4, that other means for adjusting the balance resistor could be employed. For example, instead of employing a lamp and photoresistor, a balance motor driving a balance potentiometer could be utilized.

While preferred embodiments of the invention have been shown and described, it will be apparent to those skilled in the art that changes can be made without departing from the principles and spirit of the invention, the scope of which is defined in the appended claims.

The invention claimed is:

1. A dew point hygrometer for determining the dew point of a gas sample, comprising:
   a mirror having a reflective surface exposed to the gas sample;
   a light source for directing a beam of light upon the reflective surface of the mirror;
   cooling means in heat exchange relation with the mirror;
   an optical bridge having an output, adjustable resistance means and photosensitive means responsive to light reflected from the surface of the mirror;
   servo loop control means interposed between the bridge output and the cooling means for controlling the cooling means for maintaining the temperature of the mirror at the dew point of the gas sample, the bridge being initially adjusted to provide for a predetermined thickness of condensate on the reflective surface of the mirror at the dew point of the gas sample; and
   means for compensating for contamination on the reflective surface of the mirror including timing means enabling the compensation means at predetermined time intervals and further comprising:
      means for disabling the servo loop control means to permit the mirror temperature to rise causing the condensate on the reflective surface thereof to evaporate,
      means for unbalancing the optical bridge to produce a predetermined error signal, the photosensitive means also being so arranged as then to produce an additional error signal proportional to the amount of contamination on the reflective surface of the mirror, and
      balancing means responsive to the additional error signal and arranged to adjust the adjustable resistance means thereby to compensate for the contamination.

2. A dew point hygrometer as recited in claim 1, wherein:
   the adjustable resistance means is a motor driven potentiometer; and
   the balancing means comprises a relay responsive to the additional error signal for energizing the motor driven potentiometer.

3. A dew point hygrometer as recited in claim 1, wherein the timing means comprises a timing motor.

4. A dew point hygrometer as recited in claim 3, wherein the timing motor further:
   controls the disabling means to interrupt the servo loop control means controlling the temperature of the mirror; and
   controls contacts for shorting a resistor in the optical bridge circuit for providing the predetermined error signal.

5. A dew point hygrometer as recited in claim 3, wherein the disabling means comprises a circuit energizing a relay, said circuit being completed at the predetermined time intervals, the relay when energized interrupting the control by the servo loop, control means of the cooling means, whereby the temperature of the mirror will rise and evaporate condensate therefrom.

6. A dew point hygrometer as recited in claim 5, wherein the relay, when energized, further completes the circuit of a second relay, the second relay being responsive to the additional error signal to close the circuit of a balance motor for controlling the adjustable resistance means.

7. A dew point hygrometer as recited in claim 6, wherein the first-named relay, when energized, shorts a second resistor in the optical bridge circuit means to provide the predetermined error signal.

8. A dew point hygrometer as recited in claim 6, wherein the second relay, when energized, closes a holding circuit to maintain energization of the second relay, in the event that the additional error signal persists beyond a predetermined time period.

9. A dew point hygrometer as recited in claim 6, wherein the circuit of the balance motor is held open for a predetermined time period following the completion of the circuit for the first-named relay to provide time for complete evaporation of condensate from the mirror and is then closed.

10. A dew point hygrometer for determining the dew point of a gas sample, comprising:
   a mirror having a reflective surface exposed to the gas sample;
   a light source for directing a beam of light upon the reflective surface of the mirror;
   photosensitive means responsive to light reflected from the reflective surface of the mirror;

cooling means in heat exchange relation with the mirror;

servo loop control means including circuit means responsive to the photosensitive means for controlling the cooling means for maintaining the temperature of the mirror at the dew point of the gas sample; and means for automatically and continuously compensating for contaminants on the reflective surface of the mirror comprising:
- means for introducing an alternating variation to cooling current supplied by the servo loop control means to the cooling means,
- means for detecting the amplitude of the variation sensed by the photosensitive means, and
- means responsive to the amplitude of the variation for varying a compensating resistor in the circuit means.

11. A dew point hygrometer as recited in claim 10, wherein:
- the means responsive to the amplitude of the variation comprises a lamp; and
- the compensating resistor in the circuit means comprises a photoresistor responsive to the lamp.

12. A dew point hygrometer as recited in claim 10, wherein the means for introducing the alternating variation comprises an auxiliary alternating current generator the output of which is added to the cooling current.

13. A dew point hygrometer as recited in claim 10, wherein the means for introducing the alternating variation comprises means rendering the servo loop control means self-oscillatory.

14. A dew point hygrometer as recited in claim 10, further comprising means for indicating the amplitude of the variation.

References Cited

UNITED STATES PATENTS

| | | | |
|---|---|---|---|
| 2,720,107 | 10/1955 | McBriar | 73—17 |
| 2,893,237 | 7/1959 | Coriolis et al. | 73—17 |
| 3,195,344 | 7/1965 | Francisco | 73—17 |
| 3,252,319 | 5/1966 | Wood et al. | 73—17 |

RICHARD C. QUEISSER, Primary Examiner

H. GOLDSTEIN, Assistant Examiner